United States Patent
Kobayashi

(10) Patent No.: US 8,576,335 B2
(45) Date of Patent: Nov. 5, 2013

(54) IMAGE DISPLAY APPARATUS HAVING FLICKER CONTROL AND METHOD OF CONTROLLING THE SAME

(75) Inventor: Kiwamu Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 370 days.

(21) Appl. No.: 12/817,237

(22) Filed: Jun. 17, 2010

(65) Prior Publication Data

US 2011/0007213 A1  Jan. 13, 2011

(30) Foreign Application Priority Data

Jul. 9, 2009  (JP) ................ 2009-163005

(51) Int. Cl.
*H04N 11/20* (2006.01)
*H04N 7/01* (2006.01)
*H04N 5/57* (2006.01)
*H04N 3/36* (2006.01)

(52) U.S. Cl.
USPC ............ 348/441; 348/97; 348/910; 348/687; 348/602

(58) Field of Classification Search
USPC .......... 348/459, 441, 447, 97, 910, 720, 578, 348/602, 687; 352/189; 74/436; 380/210, 380/212, 201; 345/77, 79, 89, 96, 102, 589; 353/69, 122, 121; 382/274
See application file for complete search history.

(56) References Cited

U.S. PATENT DOCUMENTS

| | | | | |
|---|---|---|---|---|
| 4,924,305 A | * | 5/1990 | Nakagawa et al. | 348/451 |
| 5,146,329 A | * | 9/1992 | Flamm | 348/607 |
| 5,488,431 A | * | 1/1996 | Gove et al. | 348/716 |
| 5,510,843 A | * | 4/1996 | Keene et al. | 348/446 |
| 5,815,208 A | | 9/1998 | Samela et al. | |
| 6,056,408 A | | 5/2000 | Kobayashi | |
| 6,183,087 B1 | | 2/2001 | Kirkpatrick et al. | |
| 6,513,932 B1 | | 2/2003 | Ehrne et al. | |
| 6,862,022 B2 | * | 3/2005 | Slupe | 345/207 |
| 7,542,619 B2 | | 6/2009 | Toyooka et al. | |
| 2002/0126218 A1 | * | 9/2002 | Willis | 348/459 |
| 2002/0168069 A1 | * | 11/2002 | Tehranchi et al. | 380/235 |
| 2004/0230940 A1 | * | 11/2004 | Cooper et al. | 717/100 |

(Continued)

FOREIGN PATENT DOCUMENTS

CN  1900772 A  1/2007
CN  101365052 A  2/2009

(Continued)

OTHER PUBLICATIONS

Chinese Office Action dated Feb. 29, 2012, in related Chinese Application No. 201010226678.3 (with English translation).

*Primary Examiner* — Victor Kostak

(74) *Attorney, Agent, or Firm* — Fitzpatrick, Cella, Harper & Scinto

(57) ABSTRACT

An image display apparatus includes a filter which obtains low-frequency image data from input image data, a multiplier which multiplies the low-frequency image data obtained by the filter by a predetermined ratio, and a subtracter which subtracts, from the input image data, the low-frequency image data multiplied by the predetermined ratio to obtain high-frequency image data. In addition, a display control unit displays, in alternate order, the low-frequency image data and the high-frequency image data, and an adjustment unit adjusts the predetermined ratio so as to set a flicker of an image displayed by the display control unit to a predetermined level.

5 Claims, 9 Drawing Sheets

(56) References Cited

U.S. PATENT DOCUMENTS

| | | |
|---|---|---|
| 2006/0227249 A1 | 10/2006 | Chen et al. |
| 2007/0103598 A1* | 5/2007 | Uro et al. .................... 348/678 |
| 2009/0073192 A1 | 3/2009 | Kobayashi |
| 2009/0153442 A1 | 6/2009 | Kimura et al. |
| 2009/0226110 A1* | 9/2009 | Chen et al. .................... 382/263 |
| 2009/0273611 A1* | 11/2009 | Itokawa et al. ............... 345/619 |
| 2009/0310016 A1 | 12/2009 | Fukuda et al. |
| 2009/0310018 A1* | 12/2009 | Sakashita et al. ............. 348/448 |
| 2010/0020230 A1* | 1/2010 | Suzuki .......................... 348/441 |
| 2010/0053222 A1* | 3/2010 | Kerofsky ...................... 345/690 |

FOREIGN PATENT DOCUMENTS

| | | |
|---|---|---|
| JP | 2002-351382 A | 12/2002 |
| JP | 2006-184896 A | 7/2006 |
| JP | 2009-145707 A | 7/2009 |

* cited by examiner

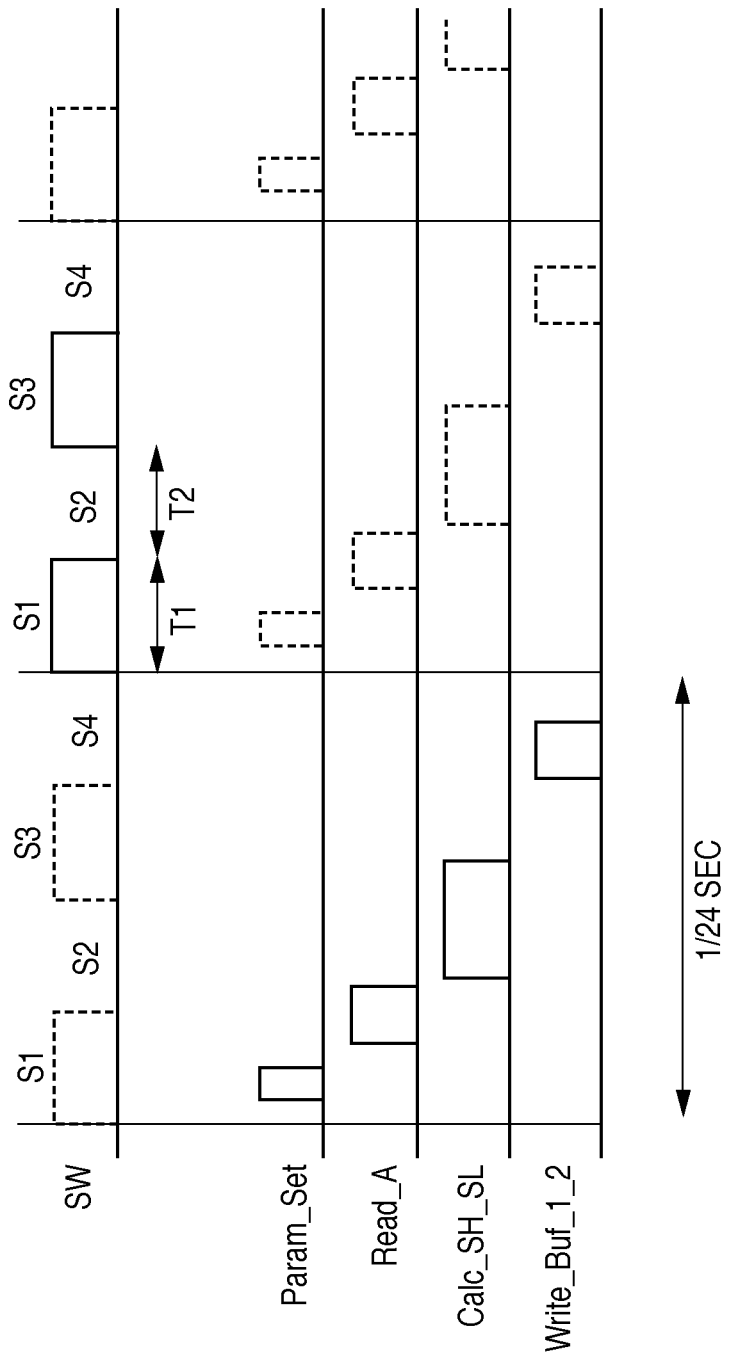

IMAGE DISPLAY APPARATUS HAVING FLICKER CONTROL AND METHOD OF CONTROLLING THE SAME

BACKGROUND OF THE INVENTION

1. Field of the Invention

The present invention relates to an image processing technique of appropriately controlling a flicker in a moving image.

2. Description of the Related Art

Many movie contents are produced at a frame frequency of 24 Hz. However, if such a movie content is displayed directly at a period of 24 Hz, the viewers perceive blink with the same period as 24 Hz, that is, a 24-Hz flicker very strongly, and accordingly suffer video quality degradation and fatigue.

To prevent this, conventionally, light is projected to a single frame on a film twice at equal intervals so that a single image is displayed twice at an equal interval. Since the two times of display are done at an equal interval, video display at a period of 48 Hz is obtained.

This operation is implemented by a so-called Geneva mechanism. The Geneva mechanism includes film feed that temporarily stops in each frame, and a disk shutter for +2 times lighting in synchronism with the film feed (for example, U.S. Pat. Nos. 6,183,087 and 6,513,932). The 24-Hz flicker is not observed in this mechanism.

Instead, a 48-Hz flicker is newly perceived. The 48-Hz flicker that replaces the 24-Hz flicker largely improves the viewers' fatigue and suffering. However, it is a fact that the 48-Hz flicker still remains, and most people recognize it.

Electronic displays that mainly aim to display TV broadcasting have gone through evolution on condition that the frame frequency of display matches that of TV broadcasting. More specifically, the frame frequency is 60 Hz in regions where NTSC is adopted, and 50 Hz in regions of PAL/SECAM.

Since the frame frequency of many movie contents is 24 Hz, TV broadcasting of movie contents does not succeed because of the difference in frame frequency. To solve this problem, for example, in the NTSC regions, a video having a period of 24 Hz is replaced with a video of 60-Hz period by a 3-2 pull-down method. The video of 60-Hz period is broadcast and directly displayed on an electronic display of 60-Hz period.

A DVD or Video CD also supplies a video that has undergone the 3-2 pull-down processing, and an electronic display displays it as an image of 60-Hz period.

Some recent DVDs or blu-ray disks are made assuming the 24-Hz period to directly express the atmosphere of 24-Hz movies. According to this method, instead of providing data having undergone the 3-2 pull-down processing as video information, the original video of 24-Hz period is provided and subjected to the 3-2 pull-down processing at the time of playback, thereby attaining a higher saving efficiency as recording media. This method is suitable for playing back a 24-Hz content without converting it (in fact, the content is played back at a period of 48 Hz as in a theater).

The present invention proposes a technique of displaying a 24-Hz content on an electronic display at a period of 48 Hz in an atmosphere as close as possible to a theater where a movie projector is used.

For example, there are conventionally the following methods of this type.

(1) A hold-type liquid crystal display or the like directly displays a 24-Hz movie content at a frame rate of 24 Hz.

(2) For example, an impulse-type display device simply doubles the frame rate of 24 Hz to display a content at 48 Hz.

(3) The frame rate is simply multiplied by four to display a content at 96 Hz.

These will be referred to as conventional display methods (1), (2), and (3) hereinafter.

However, a flicker or a double image that is usually supposed to be a detrimental effect has already become one of expression techniques of so-called film movies for a long time, and the detrimental effect itself has been accepted by viewers as atmosphere of movies. Some videos are created even in consideration of such expression.

Against this backdrop, there is a demand for a method of appropriately reproducing a flicker or a double image.

However, the above-described conventional display methods (1), (2), and (3) are not necessarily capable of display in the same atmosphere as in screening film movies in theaters. "Same atmosphere" means whether the above-described 48-Hz flicker can appropriately be reproduced, or whether a double image in visual tracking can be reproduced as in a movie.

To reproduce appropriate flickers as in a movie in a general viewing environment (for example, in a living room) where, for example, the screen size, angle of view, and ambient brightness are different from a theater, it is necessary to adjust and change at least the flicker level by image processing.

In the conventional display method (1), neither the 24-Hz flicker nor the 48-Hz flicker occurs fundamentally, or the flickers occur in a very small amount. Hence, the atmosphere of a theater cannot appropriately be reproduced.

The conventional display method (2) is the same as the projector in a theater in simply doubling the frame rate to display a content at 48 Hz. However, although the display duty is about 50% in screening in a theater, as described above, it is often, for example, 10% or less in an impulse-type display device. In this case, for example, when the amplitude is adjusted to equalize the average luminance, the amplitude of the 48-Hz fundamental component increases to 1.5 times or more than at a display duty of 50%. The 48-Hz flicker also increases to 1.5 times or more. That is, the conventional display method (2) cannot reproduce the atmosphere of a theater because the 48-Hz flicker is too large.

The conventional display method (3) raises the frame rate to 96 Hz so that the frequency component of the flicker falls outside the range detectable by human eye. This is generally welcomed but inappropriate from the viewpoint of reproducing the flicker expression in a theater. In addition, since the frame rate is simply multiplied by four, visual tracking yields not a double image as in a theater but a quadruple image. It is also inappropriate in a sense of reproducing the atmosphere of screening in a theater.

SUMMARY OF THE INVENTION

The present invention provides an image display apparatus capable of, even in an environment different from a theater, reproducing a video of the same atmosphere as that of a film movie screened in the theater, and a method of controlling the same.

According to one aspect of the present invention, an image display apparatus includes a multiplier which multiplies input image data by a predetermined ratio to obtain first image data, a subtracter which subtracts the first image data obtained by the multiplier from the input image data to obtain second image data, buffer memories each of which temporarily stores a corresponding one of the first image data and the second image data, a display control unit which reads and displays, in alternate order, the first image data and the second image data stored in the buffer memories, and an adjustment unit which adjusts the predetermined ratio so as to set a flicker of an image displayed by the display control unit to a predetermined level.

Further features of the present invention will become apparent from the following description of exemplary embodiments (with reference to the attached drawings).

BRIEF DESCRIPTION OF THE DRAWINGS

FIG. 9 is a timing chart showing the operation of the flicker control circuit according to the embodiment;

DESCRIPTION OF THE EMBODIMENTS (First Embodiment)
<Arrangement of Image Display Apparatus>

Figure 1:
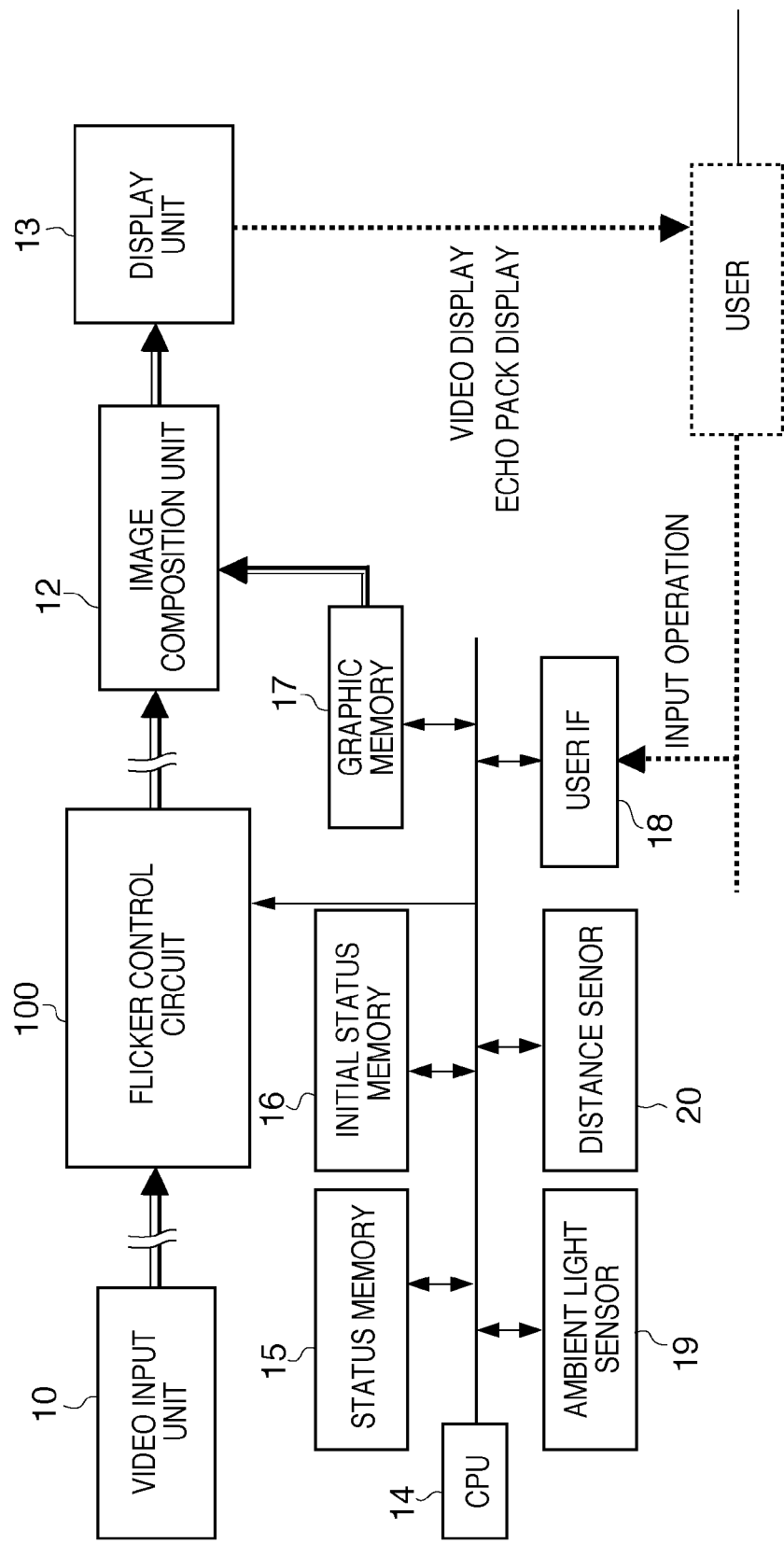
FIG. 1 is a block diagram showing the arrangement of an image display apparatus according to an embodiment.

FIG. 1 is a block diagram showing the arrangement of an image display apparatus according to this embodiment. Referring to FIG. 1, reference numeral 10 denotes a video input unit; and 100, a flicker control circuit. An image composition unit 12 composites the processing result of a process target image with On Screen Display (OSD). A display unit 13 is, for example, an impulse-type display device.

Reference numeral 14 denotes a CPU. An ambient light sensor 19 detects the brightness of the environment where the display unit 13 is installed. A distance sensor 20 detects the distance between the user and the display unit 13. A user interface (user IF) 18 is a remote controller or the like. A status memory 15 stores setting information the user sets via the user IF 18, and the detected values from the ambient light sensor 19 and the distance sensor 20. An initial status memory 16 stores the initial statuses of the ambient light level and distance, codes for calculation processing, and the like. A graphic memory 17 controls the image to be displayed as OSD.

The user can perform an operation of changing parameters via the user IF 18 while viewing the state of the image displayed on the display unit 13.

The CPU 14 decides parameters for controlling a flicker based on, for example, the ambient light level obtained by the ambient light sensor 19 and viewing distance information obtained by the distance sensor 20, thereby controlling the flicker control circuit 100. The control can also be done based on user's intension obtained via the user IF 18, screen size information stored in the initial status memory 16, or the like.

<Conventional Film Movie Display Method>

Before a description of image processing according to this embodiment, display conditions upon conventionally screening a film movie content in a theater will be explained.

Many movie contents are produced at a frame frequency of 24 Hz.

However, if such a movie content is displayed directly at a period of 24 Hz, the viewers perceive blink at a period of 24 Hz, that is, a 24-Hz flicker very strongly, and accordingly suffer video quality degradation and fatigue.

To prevent this, conventionally, light is projected to a single frame on a film twice at an equal interval so that a single image is displayed twice at an equal interval. As a result, display at a period of 48 Hz is obtained.

This operation is implemented by intermittent film feed of a Geneva mechanism and a disk shutter designed to open and close in two periods in synchronism the film feed (U.S. Pat. Nos. 6,183,087 and 6,513,932).

The 24-Hz flicker is not observed in this mechanism. Instead, a 48-Hz flicker is newly perceived. The 48-Hz flicker that replaces the 24-Hz flicker largely improves the viewers' fatigue and suffering.

In the Geneva mechanism, first, the rotation force of a motor is transmitted to a star wheel via a cam. The star wheel converts the rotary motion into an intermittent rotary motion. The intermittent rotary motion is transmitted to a sprocket, thereby intermittently feeding a movie film.

In synchronism with the intermittent film feed, a disk that shields projection light releases the shutter for the projection light. The film is fed while the shutter is shielding the projection light. Conversely, when the film stands still, the shutter opens so as to project an image printed in each frame of the film. The shutter opens twice per intermittent film feed at an equal interval as a whole, thereby implementing displaying a single image twice at 48 Hz, that is, simple 2× rate display.

Figure 2:
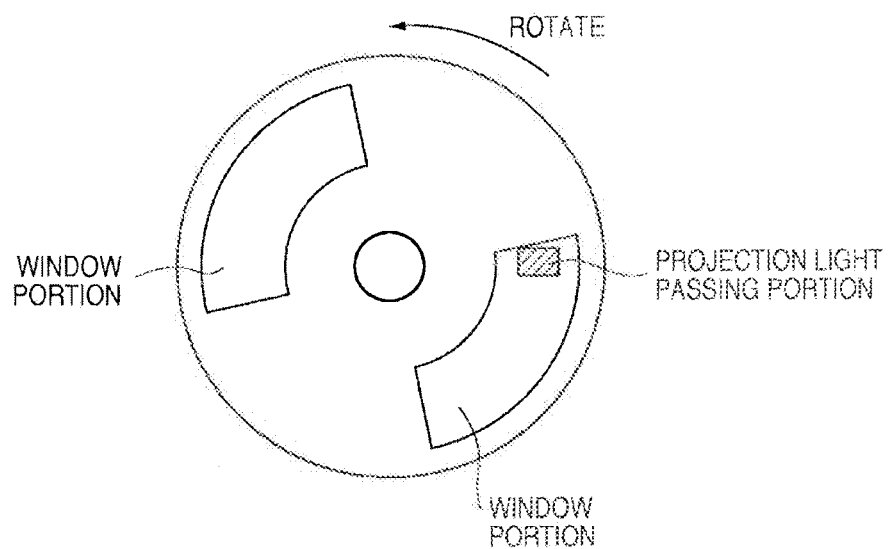
FIG. 2 is a view showing the structure of a shutter used in conventional movie screening.

The shutter is formed from a disk as shown in FIG. 2. This disk makes one revolution for 1/24 sec. The disk has slit-shaped opening portions (window portions) at two point-symmetrical locations, as shown in FIG. 2. The angle of each opening portion is about ¼ of 360°, that is, about 90°.

When such a disk is used as a shutter, projection light is projected twice at an equal interval of 1/24 sec, that is, 48 Hz. The duty ratio of the light projection time is about 50%.

FIG. 2 illustrates a state immediately after a window portion has come to the projection light passing portion. That is, FIG. 2 shows the rotation position at the instant of the leading edge of one light projection pulse.

In such display with lighting at the period of 48 Hz, a 48-Hz flicker is observed. Since the display is simple 2× rate display, a double image is observed by visual tracking of a moving part.

However, the 48-Hz flicker or a double image observed by visual tracking of a moving part, which is usually supposed to be a detrimental effect, has already become one of expression techniques of so-called film movies for a long time. The detrimental effect itself has been accepted by viewers as atmosphere of movies as long as it falls within the acceptable limits. Some film movie contents are created assuming such expression.

In consideration of this background, the present invention proposes a technique of intentionally reproducing flicker expression of double frequency (48 Hz) or a double image expressed in a conventional theater appropriately on an electronic display in a home or digital theater.

<Flicker Control Method>

A flicker control method according to this embodiment will be described below with reference to FIGS. 3 to 6C. In FIGS. 3 to 6C, the ordinate represents the light intensity (or a corresponding signal strength), and the abscissa represents time.

Figure 3:
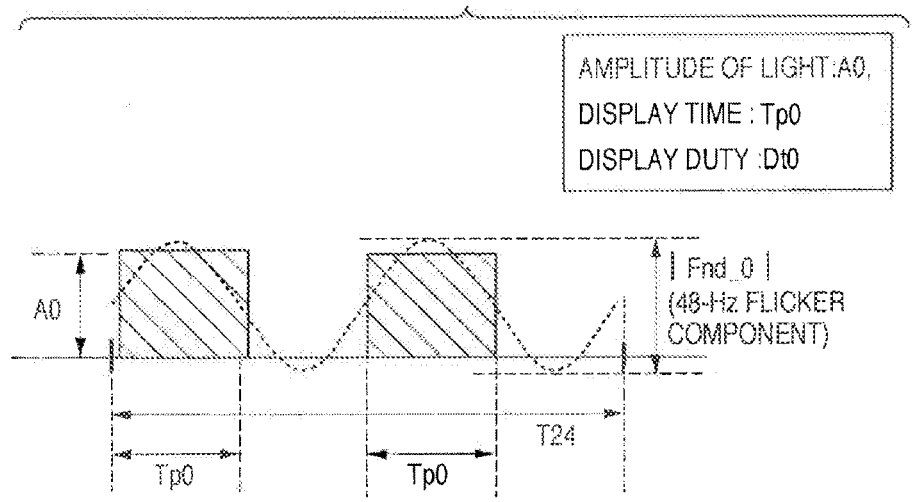
FIG. 3 is a graph showing an example of a display waveform in projection by a Geneva mechanism.
Figure 4:
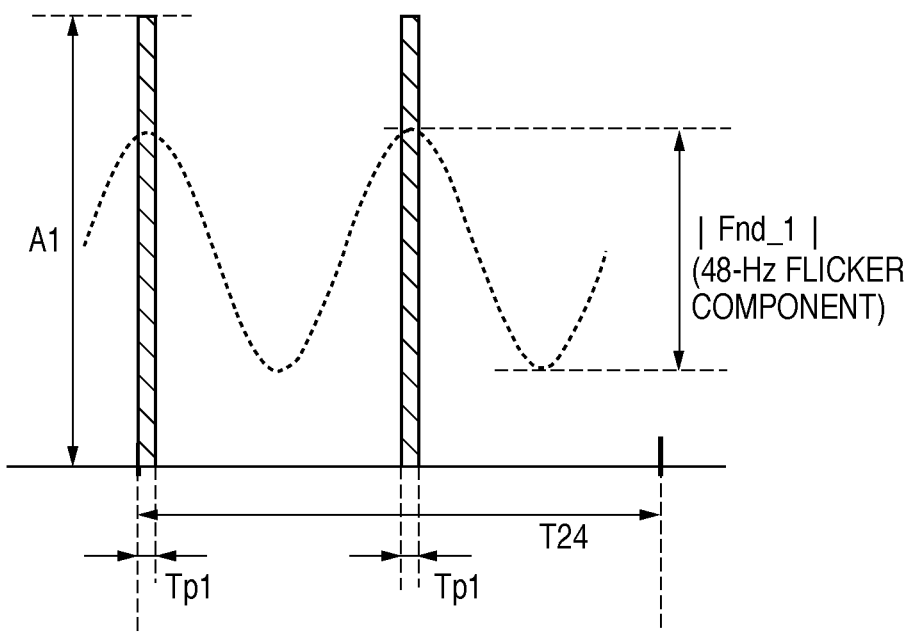
FIG. 4 is a graph showing an example of a display waveform in 2× rate display (48-Hz display) by an impulse-type display device.
Figure 5:
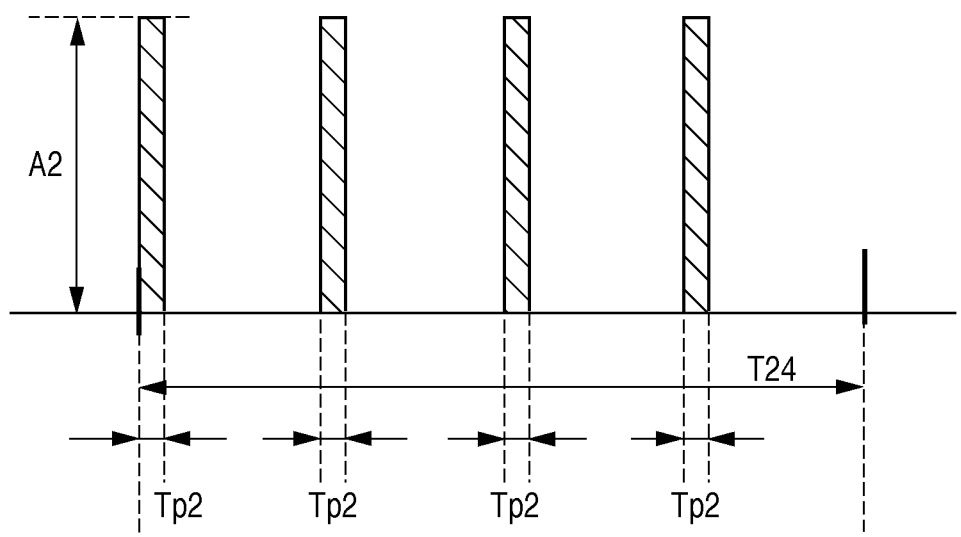
FIG. 5 is a graph showing an example of a display waveform in 4× rate display (96-Hz display) by an impulse-type display device.
Figure 6A:
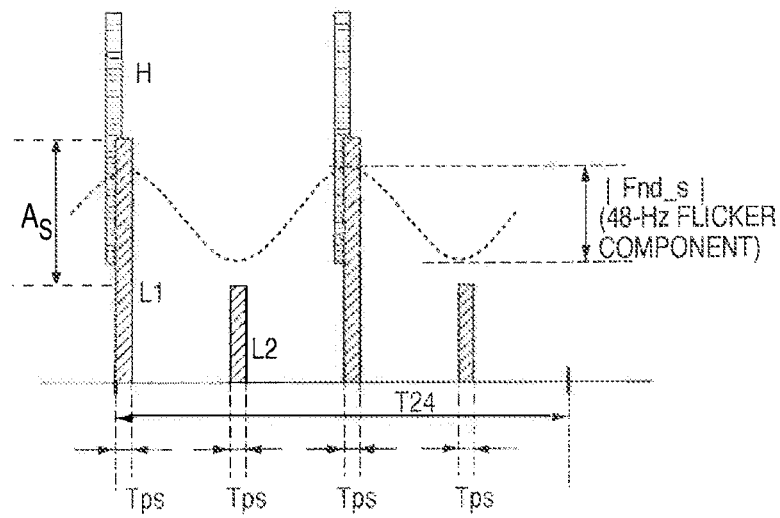
FIGS. 6A to 6C are graphs showing examples of display waveforms according to the embodiment.
Figure 6B:
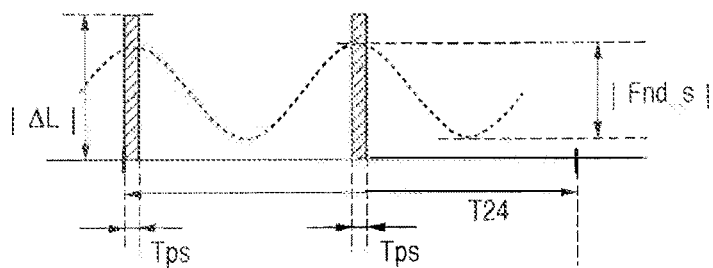

FIG. 3 shows a display waveform in projection by a Geneva mechanism. FIG. 4 shows a display waveform in 2× rate display (48-Hz display) by an impulse-type display device. FIG. 5 shows a display waveform in 4× rate display (96-Hz display) by an impulse-type display device. FIGS. 6A and 6B show display waveforms after image processing according to this embodiment.

Referring to FIG. 3, let A0 be the amplitude of light, Tp0 be the time of one pulse width, and Dt0 be the display duty. The display duty Dt0 is given by $$Dt0 = Tp0 * 2/T24 \quad (0\text{-}0)$$

where T24 means ¹⁄₂₄ sec.

Referring to FIG. 4, let A1 be the amplitude of light, Tp1 be the time of one pulse width, and Dt1 be the display duty. The display duty Dt1 is given by $$Dt1 = Tp1 * 2/T24 \quad (0\text{-}1)$$

Referring to FIG. 5, let A2 be the amplitude of light, and Tp2 be the time of one pulse width. Referring to FIG. 6A, let As be the amplitude of light, and Tps be the time of one pulse width. Referring to FIG. 6B, let $|\Delta L|$ ($=|L1-L2|$) be the amplitude of light, Tps be the time of one pulse width, and Dts be the display duty. The display duty Dts is given by $$Dts = Tps * 2/T24 \quad (0\text{-}3)$$

In this embodiment, $$Tps = Tp1 = Tp2 \quad (0\text{-}4)$$

$$Dts = Dt1 \quad (0\text{-}5)$$

Figure 6C:
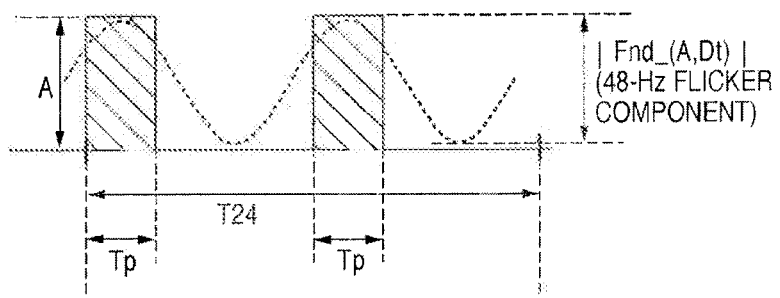

FIG. 6C shows a display waveform obtained by generalizing those in FIGS. 3, 4, and 5. Let A be the amplitude of light, Tp be the time of one pulse width, and Dt be the display duty. The display duty Dt is given by $$Dt = Tp * 2/T24 \quad (0\text{-}6)$$

FIG. 3 shows how to display a film movie content for generally screening in a theater, that is a change in light intensity. In many cases, the display duty in film movie screening is about 50%, as described above. Hence, in this embodiment (the example in FIG. 3), the duty is set to 50%. Letting A0 be the amplitude of projection light intensity, the amplitude (peak to peak) of the 48-Hz component in this projection is $A0*4/\pi$.

The present invention proposes a method of reproducing the same flicker expression as in the display method shown in FIG. 3 and the same double image expression as in visual tracking.

In the display method in a conventional theater shown in FIG. 3, the duty is about 50% in many cases, as described above. The broken line in FIG. 3 indicates the fundamental component, that is, 48-Hz component of this display method. The 48-Hz component is supposed to represent the 48-Hz flicker amount and quantitatively represent the flicker expression in a theater.

When the amplitude of the 48-Hz fundamental component in FIG. 3 is expressed as $|Fnd\_0|$, and Dt0=0.5, the amplitude is given by $$|Fnd\_0| = A0 * 4/\pi \quad (1\text{-}1)$$

The 48-Hz fundamental component in each case will be represented by Fnd**.

FIG. 4 shows a case in which an impulse-type display device simply doubles the frame rate of the original signal to display an image twice at 48 Hz, as in FIG. 3. This corresponds to the above-described conventional display method (2). A 48-Hz fundamental component $|Fnd\_1|$ in this case is about 1.5~1.6 times $|Fnd\_0|$. That is, the flicker amount is larger than in FIG. 3.

FIG. 5 shows a case in which an impulse-type display device simply multiplies the frame rate by four to display a content at a frame rate of 96 Hz. Since the 48-Hz flicker is almost zero in this case, the method is inappropriate from the viewpoint of reproducing the 48-Hz flicker in a theater. Note that in this case, the fundamental component of the flicker is 96 Hz. However, the human eye cannot respond to a 96-Hz blink so no flicker can be perceived actually. In addition, no double image is observed in visual tracking. Instead, a quadruple image is observed as a multiple image. In this aspect as well, the method is not always suitable for reproducing screening in a theater.

FIGS. 6A to 6C show display waveforms according to this embodiment. Associated techniques are disclosed in Japanese Patent Laid-Open Nos. 2002-351382 and 2006-184896 and U.S. Pre-Granted Publication No. 2006/0227249. The present invention is an improvement of the conventional techniques. These techniques will be referred to as "spatial frequency separation subframe distribution methods", which will also be abbreviated as "spatial frequency separation methods".

In a "spatial frequency separation method", input image data A is separated into low-frequency image data L and high-frequency image data H. Based on these data, a high-frequency enhanced image SH=A+H=H+L/2 and a high-frequency suppressed image SL=L/2 are created. These images are displayed in subframes in alternate order to directly reproduce the original image and simultaneously improve flicker suppression and motion blur (hold type) or double blur (impulse type).

To completely suppress the flicker by the "spatial frequency separation method", the low-frequency component contained in the high-frequency enhanced image SH and that contained in the high-frequency suppressed image SL are set to the same level. When the ratio of the two low-frequency component levels is intentionally changed, an intended flicker can be realized without any other image quality change.

As shown in FIG. 6A, let L1 be the low-frequency component of a first subframe (high-frequency enhanced image SH) and L2 be the low-frequency component of a second subframe (high-frequency suppressed image SL). A flicker is supposed to be determined only by the value L because the spatial low-frequency component is mainly concerned in the flicker. That is, a magnitude $|Fnd\_s|$ of the 48-Hz fundamental component of the flicker shown in FIG. 6A is supposed to be determined by a variation in the value L.

To obtain $|Fnd\_s|$, a waveform obtained by subtracting L2 from L of each pulse in FIG. 6B, that is, a waveform in which $\Delta L = L1 - L2$ exists only at even-numbered positions is taken into consideration.

In the present invention, the flicker is controlled by controlling the relationship between L1 and L2 (more specifically L1–L2), thereby reproducing the same flicker as in the display method shown in FIG. 3. The flicker control can be done independently of the double image. Hence, the state of the double image does not change even when the flicker level is changed.

The flicker amount control range is maximum in FIG. 4 and zero at the minimum. Hence, a condition equal to that in FIG. 3 always exists in the adjustment range.

<Arrangement and Operation of Flicker Control Circuit>

Figure 8:
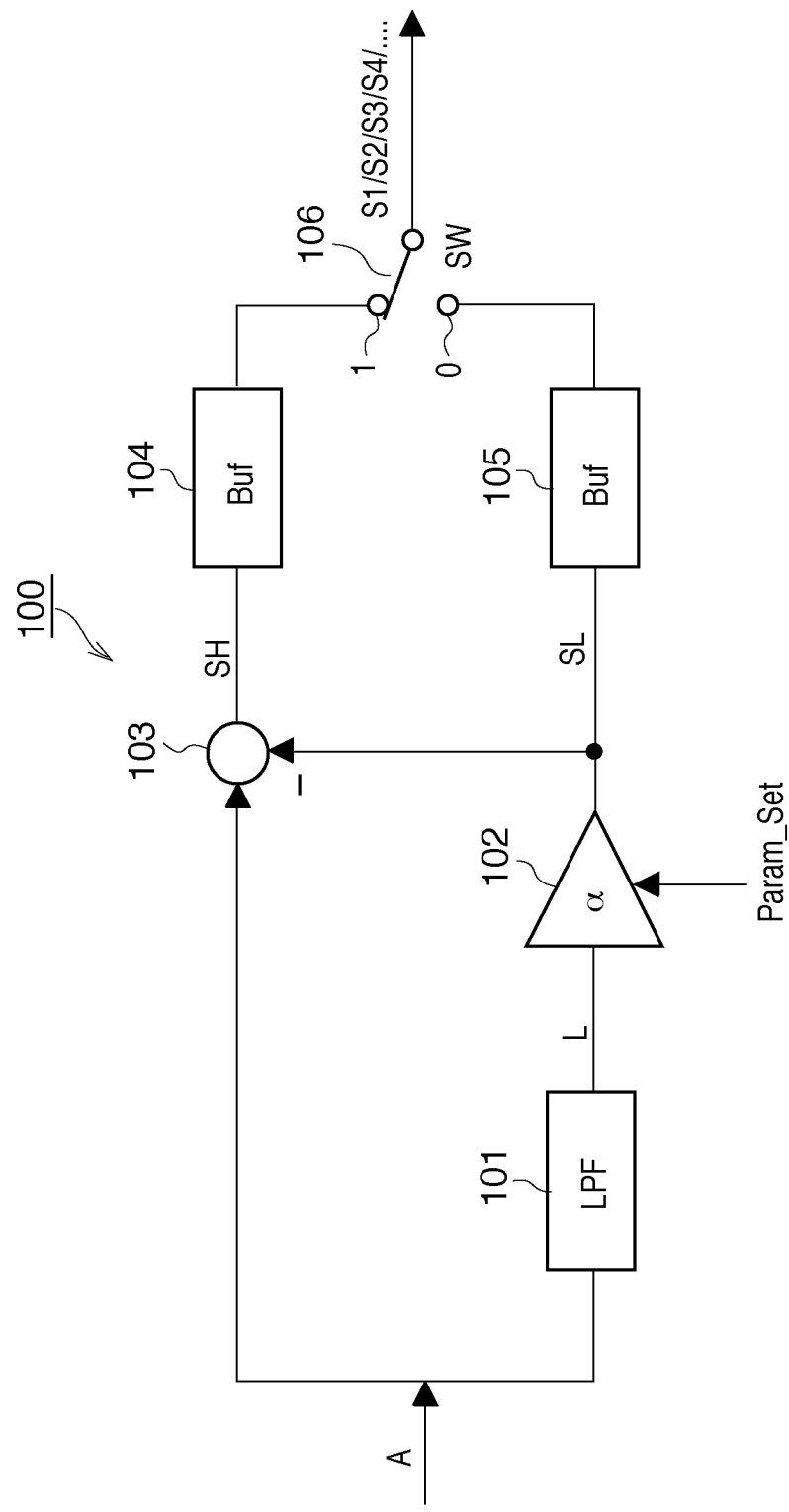
FIG. 8 is a block diagram showing the arrangement of a flicker control circuit according to the embodiment.

FIG. 8 is a block diagram showing the arrangement of the flicker control circuit 100 according to this embodiment. The flicker control circuit 100 improves the conventional "spatial frequency separation subframe redistribution method".

The upper side of FIG. 8 indicates a procedure of creating the high-frequency enhanced image SH from the input image A. The lower side indicates a procedure of creating the low-frequency image (high-frequency suppressed image) from the input image A. A low-pass filter (LPF) 101 obtains the low-frequency image L with a limited spatial frequency from the input image A. A multiplier 102 multiplies the low-frequency image by a predetermined ratio α. A subtracter 103 subtracts the output of the multiplier 102 from the input image. A BUF 104 is a buffer memory that temporarily stores the high-frequency enhanced image SH. A BUF 105 is a buffer memory that temporarily stores the high-frequency suppressed image SL. An SW 106 is a switch to read data from the BUF 104 or the BUF 105 at a predetermined timing.

FIG. 9 is a timing chart showing the operation of the flicker control circuit 100 according to this embodiment. T1 and T2 in the timing of the SW 106 represent the same time length. Hence, when the frame frequency is 24 Hz, the SW 106 is changed over at a period of 48 Hz (that is, T1+T2=1/48 sec).

The flicker control circuit 100 of this embodiment is externally controlled by changing the value of the gain α of the multiplier 102. Referring to FIG. 9, Param_Set is the timing at which the gain parameter is set in the multiplier 102, Read_A indicates the timing at which the input image A is read for each frame, Calc_SH_SL is the timing at which the low-pass filter 101, multiplier 102, and subtracter 103 execute calculations, and Write_Buf_1_2 is the timing at which SH is written in the BUF 104, and SL is written in the BUF 105.

SW in FIG. 9 is the timing at which the SW 106 in FIG. 8 is changed over. When SW=High, the SW 106 is connected to the 1) side. When SW=Low, the SW 106 is connected to the 0) side. This connection controls the display so that the data in the BUFs 104 and 105 are read and displayed in alternate order.

With this operation, the flicker control circuit 100 outputs $S1 \Rightarrow S2 \Rightarrow S3 \Rightarrow S4$ in this order.

This arrangement allows to execute calculation processing represented by $$L=LPF(A) \quad (2\text{-}1)$$

$$SH=A-\alpha *L \quad (2\text{-}2)$$

$$SL=\alpha L \quad (2\text{-}3)$$

$$A=H+L \quad (2\text{-}4)$$

Hence, $$SH=H+(1-\alpha)L \quad (2\text{-}5)$$

The difference ΔL between the low-frequency component of SH and that of SL is given by $$\Delta L=(1-2*\alpha)*L \quad (2\text{-}6)$$

For example, when α=0.5, SH=H+0.5 L, SL=0.5 L, and ΔL=0. That is, the low-frequency components of SH and SL have the same value, and no flicker exists. When α=0, SH=H+L, SL=0, ΔL=L. At this time, the flicker is maximum.

<Relationship Between Display Duty and Flicker Value>

A detailed method of determining the flicker controlled variable will be described next.

First, as shown in FIG. 6C, when the display duty is Dt=Tp*2/T24, the amplitude of the fundamental component of the rectangular wave having the amplitude A is represented by |Fnd_(A, Dt)|. Then, from the formula of Fourier series $$|Fnd\_(A,Dt)|=A*4/\pi *\text{SIN}(\pi *Dt) \quad (3\text{-}1)$$

$$(Dt=Tp*2/T24) \quad (3\text{-}2)$$

holds.

The condition in FIG. 3 (the display condition of a theater) is substituted into equation (3-1). In FIG. 3, since A=A0, and Dt0=0.5, we obtain $$|Fnd\_0(A=A0,Dt=0.5)|=A0*4/\pi *\text{SIN}(\pi *0.5)=A0*4/\pi \quad (3\text{-}3)$$

The present invention assumes that even when the display duties are different, the luminance levels are set to the same value (more specifically, when the duty is low, the instantaneous value of the light intensity becomes large, and when the duty is high, the instantaneous value becomes small). More specifically, the amplitude A is almost in inverse proportion to the duty. For example, to set the amplitude A when the duty is always Dt to the same luminance as in FIG. 3, since Dt0=0.5, $$A=A0*(Dt0/Dt)=A0*(0.5/Dt) \quad (3\text{-}4)$$

That is, under this condition, equation (3-1) can be rewritten as $$|Fnd(Dt)|=A0*(0.5/Dt)*4/\pi *\text{SIN}(\pi *Dt) \quad (3\text{-}5)$$

That is, when the luminance is set at a predetermined level, |Fnd| is uniquely determined by Dt.

When a relative value given by $$|FND\_\text{relativ}(Dt)|=|Fnd(Dt)|/|Fnd\_0(A=A0,Dt=0.5)| \quad (3\text{-}6)$$

is defined for the case in FIG. 3, we obtain $$|FND\_\text{relativ}(Dt)|=(0.5/Dt)*\text{SIN}(\pi *Dt) \quad (3\text{-}7)$$

Figure 7A:
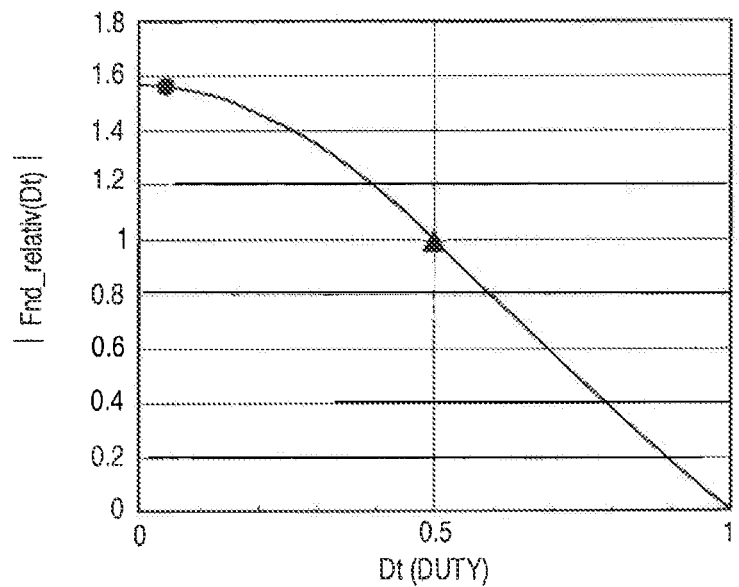
FIG. 7A is a graph showing the characteristics of a 48-Hz flicker relative intensity.

Equation (3-7) expresses the 48-Hz flicker relative intensity when the amplitude of light intensity is in inverse proportion to the duty as the function of Dt. FIG. 7A shows the characteristic of equation (3-7).

Calculation is performed based on this equation. When the impulse-type display device as shown in FIG. 4 displays an image, the flicker level rises relative to the case in FIG. 3. In many impulse-type display devices, Tp1=1 msec or less. Hence, assume that the display pulse width in FIG. 4 is Tp=0.5 ms. At this time, from equation (3-2), we obtain $$Dt1=(0.5 \text{ msec})*2/(1/24 \text{ sec})=0.024 \quad (3\text{-}8)$$

This is applied to equation (3-7) to obtain $$|FND\_1\_\text{relativ}(Dt=Dt1)|=1.57 \quad (3\text{-}9)$$

As is apparent, the flicker amount in FIG. 4 is 1.57 times as large as in FIG. 3.

<Flicker Controlled Variable Determination 1 (Basic Controlled Variable)>

The display waveform shown in FIG. 6A assumes display driving by the same device as in FIG. 4, and the display duty is the same as in FIG. 4 (Tps=Tp1).

In this embodiment, the flicker value that increases by 1.57 times in display at the duty shown in FIG. 4 is made smaller by setting the parameters in the spatial frequency separation method as shown in FIG. 6A to appropriate values, thereby obtaining a display waveform closer to that in FIG. 3.

The waveform of this embodiment, that is, |Fnd_s| in FIG. 6A is obtained by the same method as that for |Fnd_s| in FIG. 6B.

The original level in FIG. 6B (corresponding to A0 in FIG. 3 and A1 in FIG. 4) is the absolute value of the difference ΔL between L1 and L2.

Since the flicker is mainly determined by the low-frequency component, the difference between the low-frequency component levels may be used as the difference between the image level of the first subframe and that of the second subframe. More specifically, |ΔL| is used in place of A in FIG. 3 or A1 in FIG. 4. Since L2=αL, L1+L2=L, and ΔL=L1−L2, ΔL is given by $$\Delta L = (1-\alpha)L - \alpha L = (1-2\alpha)L \quad (3\text{-}11)$$

In the present invention, α is controlled for the display waveform shown in FIG. 6B, thereby equalizing the FND value (Fnd_s) in FIG. 6A with that in FIG. 3.

From equation (3-1), we obtain $$|Fnd\_s| = |\Delta L| * 4/\pi * \mathrm{SIN}(\pi * Dts) \quad (3\text{-}12)$$

From equation (3-11), we obtain $$|Fnd\_s| = (1-2\alpha)L * 4/\pi * \mathrm{SIN}(\pi * Dts) \quad (3\text{-}13)$$

When $$|FND\_s\_relative| = |Fnd\_s|/|Fnd\_0(A=A0, Dt=0.5)| \quad (3\text{-}14)$$

is defined, like equation (3-6), |FND_s_relative|=1 in this embodiment, and $$|FND\_s\_relative| = (1-2\alpha) * L * 4/\pi * \quad (3\text{-}14\text{-}2)$$
$$\mathrm{SIN}(\pi * Dts)/(A0 * 4/\pi)$$
$$= (1-2\alpha) * L * \mathrm{SIN}(\pi * Dts)/A0$$

Equation (3-4) is applicable not only to A but also to L. Since L=A0*(0.5/Dts), we obtain $$|FND\_s\_relative| = (1-2\alpha)*(0.5/Dts)*\mathrm{SIN}(\pi*Dts)$$

Since Dts=Dt1, this is rewritten as $$|FND\_s\_relative| = (1-2\alpha)*(0.5/Dt1)*\mathrm{SIN}(\pi*Dt1) \quad (3\text{-}15)$$

As described above, since (0.5/Dt1)*SIN(π*Dt1)=1.57 when Dt1=0.024, $$|FND\_s\_relative| = (1-2\alpha)*1.57 \quad (3\text{-}16)$$

When α which ensures FND_s_relative=1 is defined as α0, $$|FND\_s\_relative| = (1-2\alpha 0)*1.57 = 1$$

Hence, $$\alpha 0 = 0.18 \quad (3\text{-}17)$$

$$L1:L2 = 1-\alpha 0:\alpha = 0.82:0.18 \quad (3\text{-}18)$$

Hence, in the display method shown in FIG. 6A, when the ratio of L1 to L2 is 0.82:0.18, the flicker in FIG. 6B of this embodiment is the same as in FIG. 3.

This will be generalized again. When L1:L2=1−α:α, $$FND\_s\_relative = |Fnd\_s|/|Fnd\_0(Dt0)| = 1$$

That is, a combination of α and Dt which satisfies $$(1-2\alpha)*(0.5/Dt)*\mathrm{SIN}(\pi*Dt)/\mathrm{SIN}(\pi*Dt0) = 1 \quad (3\text{-}19)$$

can ensure FND_s_relative=1

<Flicker Controlled Variable Determination 2 (Controlled Variable Correction)>

In this embodiment, the flicker control circuit designed as shown in FIG. 8 can reproduce, on an electronic display, the flicker of a film movie in a theater by a combination of α and Dt, which satisfies equation (3-16). However, for example, the environment of a theater and that of a living room are largely different. First, the ambient brightness is different. Second, the angle of view is different. Actually, correction needs to be performed in consideration of these factors.

As for the difference in ambient brightness, a theater screens a movie in an almost pitch dark room. On the other hand, a kind of light usually exists in, for example, a living room. That is, it is generally brighter than a theater. Hence, even when a content is displayed with an equivalent flicker, the flicker expression is insufficient. Display needs to be performed with a slightly stronger flicker. In this embodiment, the brightness of viewing environment is detected using the ambient light sensor 19 so that the controlled variable of flicker can be controlled based on it.

As for the difference in the angle of view, the angle of view recommended for a theater is 45° in many cases. Hence, a seat where the angle of view is 45° is supposed to be the best in a theater, and most contents are produced based on it. On the other hand, for an electronic display such as a 1920*1080 full High Definition (HD), 3H viewing environment is recommended. At this time, the angle of view is about 35°. Hence, the angle of view is smaller in viewing at this distance, and the degree of flicker to be perceived becomes lower. From this viewpoint as well, display needs to be done with a slightly stronger flicker. In this embodiment, the distance between the user and the display unit 13 is detected using the distance sensor 20 so that the controlled variable of flicker can be controlled based on it.

The third correction factor is the set level of the display luminance of the electronic display. Generally, when the set level is high, the flicker is corrected to a relatively small amount. When the set level is low, the flicker is set to be relatively large.

The fourth correction factor is the individual difference. The present invention provides matching the flicker expression on an electronic display with that in screening in a theater, and the individual difference is basically small. However, a person who is sensitive to a flicker by nature would desire a relatively small flicker. A person who is not so sensitive would more realistically feel expression similar to that in screening in a theater by increasing the flicker. In this embodiment, the user can designate a flicker value representing the flicker intensity via the user IF 18. The flicker control circuit 100 can control the controlled variable of flicker in accordance with the designation.

To do this, in place of the value α0 which is originally supposed to be set, the set value α is newly defined in consideration of the above-described four factors. At this time, α0, α, and the factors have a relationship given by $$1-\alpha = (1-\alpha 0)*(1+k1*Env/Ldisp+k2*Ldisp+ \\ k3*AngleCinema/AngleDisp+k4*Prsnl) \quad (4)$$

where Env is the ambient light level, Ldisp is the distance luminance set level, AngleDisp is a parameter representing the angle of view of the electronic display, AngleCinema is a parameter representing the angle of view in a theater, Prsnl is a parameter representing the intensity of individual taste, and k1, k2, k3, and k4 are positive proportional coefficients.

Figure 7B:
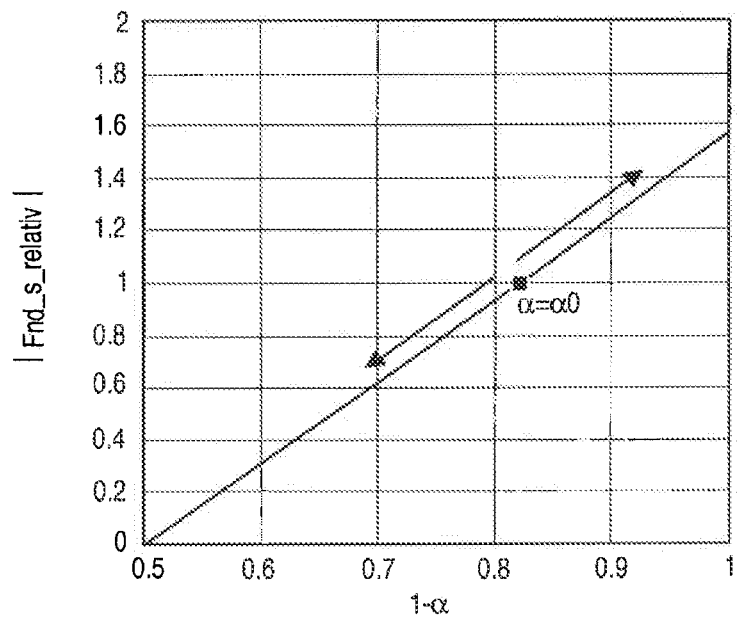
FIG. 7B is a graph showing the relationship between 1−α and |Fnd_s_relative|.

FIG. 7B shows the relationship between $1-\alpha$ and |Fnd_s_relativ|. A plot position indicated by a square in FIG. 7B represents a condition for $\alpha=\alpha 0$, that is, without the above-described correction. At this position, |Fnd_s_relativ|=1.

When the correction represented by equation (4) is applied to it, the value $\alpha$ becomes larger or smaller than $\alpha 0$. More specifically, the position determined by the actual value $\alpha$ in FIG. 7B shifts upward or downward as indicated by the arrows.

Accordingly, the value of Fnd_s_relativ also changes upward or downward. That is, this allows to adjust the value |Fnd_s_relativ| on the electronic display to a value with which the same flicker expression as in screening in a theater can be obtained in consideration of the influence of the environmental factors.

Note that in this embodiment, the effect does not change even when the positions of even-numbered signals and odd-numbered signals are exchanged. That is, the same effect can be obtained.

(Second Embodiment)

Figure 10A:
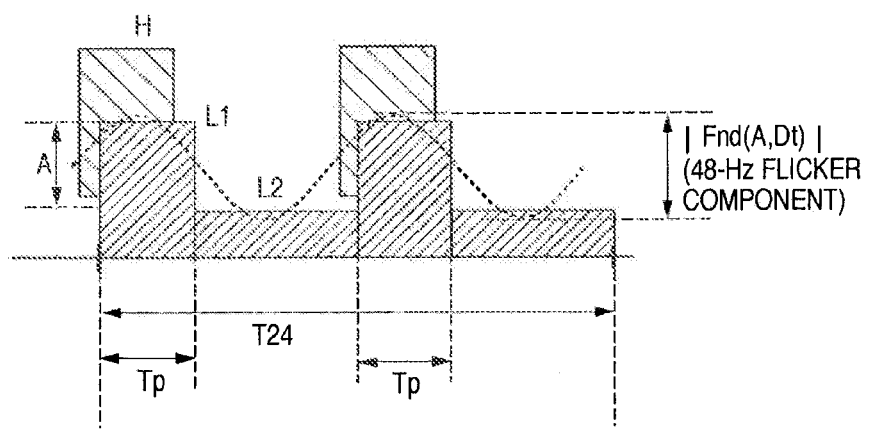
FIGS. 10A and 10B are graphs showing examples of display waveforms according to the second embodiment.
Figure 10B:
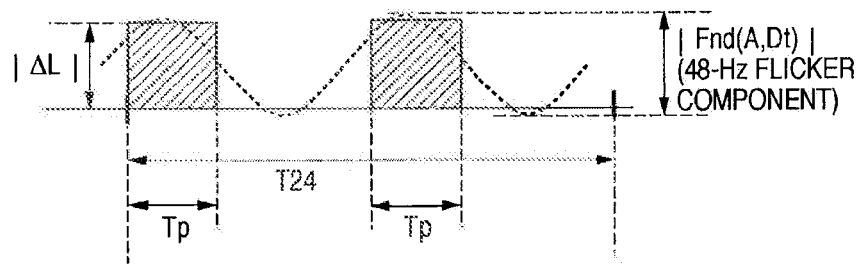

In the second embodiment, a case of a hold-type display device will be described. FIGS. 10A and 10B show display waveforms according to this embodiment.

FIG. 10A corresponds to FIG. 6A of the first embodiment. As shown in FIG. 10A, in the second embodiment, first and second subframes do not have the same time length. The time length of the first subframe is shorter, and that of the second subframe is longer. The ratio, that is, duty of the time length of the first subframe to the entire time is represented by DtH, and the ratio, that is, duty of time length of the second subframe to the entire time is represented by DtL.

The overall arrangement of an image display apparatus, the arrangement of a flicker control circuit, and the operation timing of the flicker control circuit according to this embodiment are the same as in the first embodiment (FIGS. 1, 8, and 9). In the second embodiment, S1, S2, S3, and S4 sequentially output from the flicker control circuit shown in FIG. 8 are temporarily buffered to drive the device. At this time, the device is driven at such a control timing that generates a difference between the time length of the first subframe and that of the second subframe. The ratio of the time length to the entire time is the duty DtH or DtL.

Note that this embodiment will be explained by exemplifying a case in which DtH<DtL. The effect of the present invention can be obtained even in normal 2× rate driving, that is, DtH=DtL. When DtH<DtL, the maximum flicker value increases, and the flicker adjustment range widens. Hence, the effect of the present invention becomes clearer.

In this embodiment, the ratio of the low-frequency component of the first subframe to that of the second subframe is controlled using the "spatial frequency separation method", thereby reproducing a 48-Hz flicker of intended level, as in the first embodiment.

In this embodiment, the flicker is controlled by controlling the relationship between L1 and L2 in FIG. 10A, thereby reproducing the same flicker as in the display shown in FIG. 3 (FIG. 10B). The flicker control can be done independently of the double image, as in the first embodiment. That is, the state of the double image does not change even when the flicker level is changed.

<Flicker Adjustment Range>

The flicker adjustment range according to this embodiment is determined by the ratio of DtH and DtL. An adjustment range when the display duty of the first subframe is DtH is obtained below.

The flicker is maximized at a predetermined duty, that is, when a $\alpha=0$, as in the first embodiment. At this time, the light intensity is wholly distributed to the first subframe at the duty DtH.

The 48-Hz fundamental component at this time is obtained by substituting Dt=DtH into equation (3-7). Hence, we obtain $$|Fnd\_4\_relativ\_Max|=(0.5/DtH)*SIN(\pi*DtH) \quad (5\text{-}1)$$

When, for example, DtH=0.3 is set as a realistic value, $$|Fnd\_4\_relativ\_Max|=(0.5/0.3)*SIN(\pi*0.3)=1.35 \quad (5\text{-}2)$$

This is the maximum relative flicker value.

As described in the first embodiment, the relative flicker value can be adjusted by the value. As shown in FIG. 7B, when $\alpha=0$, $1-\alpha=1$. At this time, the relative flicker value is maximum as is represented by equation (5-2), that is, $$|Fnd\_4\_relativ|=|Fnd\_4\_relativ\_Max|=1.35$$

Similarly, as shown in FIG. 7B, when $\alpha=0.5$, $1-\alpha=0.5$. At this time, the relative flicker value is minimum, that is, $$|Fnd\_4\_relativ|=0$$

This enables to control |Fnd_4_relativ| from 0 to 1.35 by the value $\alpha$. More specifically, a maximum flicker level within the range of 0 to 1.35 times that in the case shown in FIG. 3 at maximum can be implemented. Within this range, correction control based on external factors can be performed, as indicated by equation (4), as in the first embodiment.

Note that in this embodiment, the effect does not change even when the positions of even-numbered signals and odd-numbered signals are exchanged. That is, the same effect can be obtained.

(Third Embodiment)

Figures 11, 12:
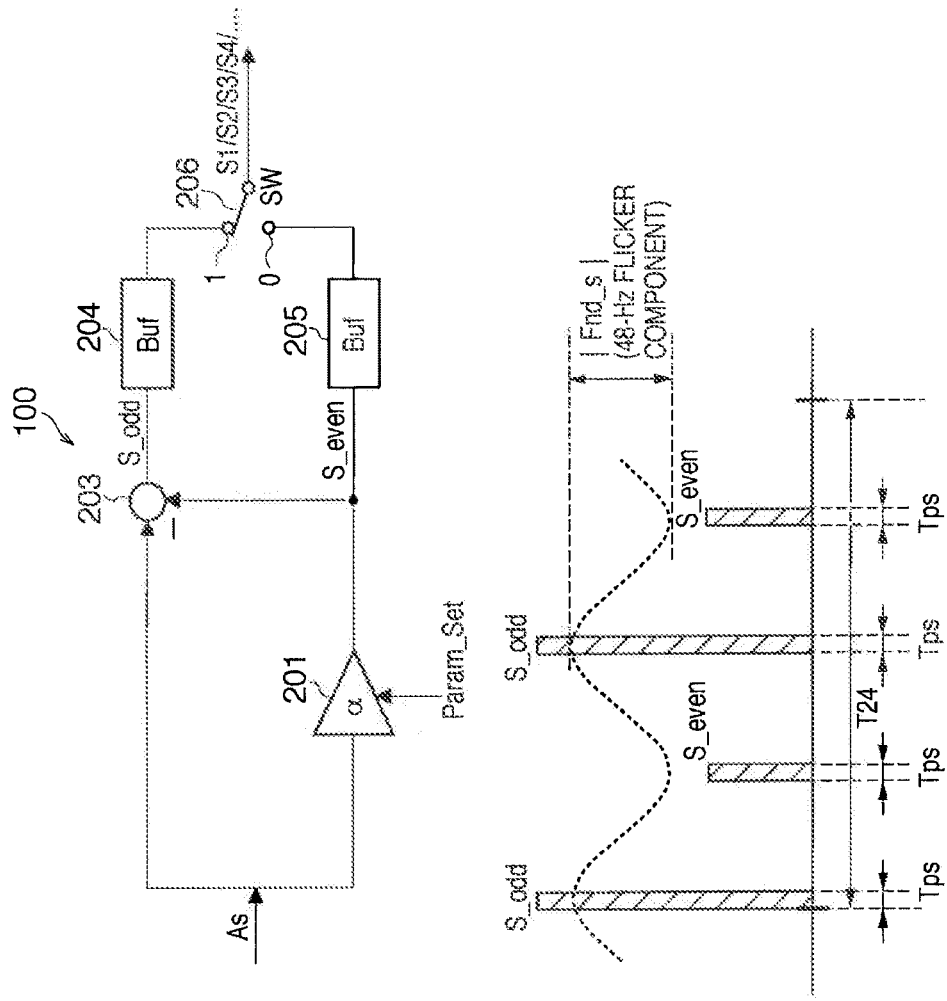
FIG. 11 is a block diagram showing the arrangement of a flicker control circuit according to the third embodiment.
FIG. 12 is a graph showing an example of a display waveform according to the third embodiment.

The overall arrangement of an image display apparatus according to the third embodiment is the same as in the first and second embodiments (FIG. 1). FIG. 11 is a block diagram of a flicker control circuit according to this embodiment. FIG. 12 shows a display waveform according to this embodiment.

In this embodiment, no processing concerning the spatial frequency like the above-described "spatial frequency separation method" is performed. S1, S2, S3, and S4 in FIG. 11 are identical spatial frequency components which exhibit signal-waveforms with different amplitudes.

The upper side of FIG. 11 indicates a procedure of generating an image S_odd corresponding to an odd-numbered subframe. The lower side indicates a procedure of generating an image S_even corresponding to an even-numbered subframe.

A multiplier 201 multiplies input image data As by a predetermined ratio $\alpha$, thereby obtaining first image data. The first image data output from the multiplier 201 is S_even. A subtracter 203 subtracts S_even from the input signal As to generate S_odd that is second image data.

Hence, S_odd and S_even are given by $$S\_odd=As*(1-\alpha) \quad (6\text{-}1)$$

$$S\_even=As*\alpha \quad (6\text{-}2)$$

In this embodiment, data corresponding to |ΔL| in the first embodiment is $$|S\_odd-S\_even|$$

From equations (6-1) and (6-2), $$|S\_odd-S\_even|=(1-2\alpha)*As \quad (6\text{-}3)$$

holds.

Hence, letting Dt5 be the duty determined by one pulse width Tps according to this embodiment (that is, Dt5=Tps*2/

T24), the 48-Hz fundamental component of the display method shown in FIG. 12 is given by $$|Fnd\_s| = (1-2\alpha)As*4/\pi*\text{SIN}(\pi*Dt5) \quad (6\text{-}4)$$

like equation (3-13).

Hence, letting Dt5 be the duty of the first and second subframes according to this embodiment, the relative value of the 48-Hz fundamental component in the display method shown in FIG. 12 is given by $$|FND\_s\_relative| = |Fnd\_s|/|Fnd\_0| \quad (6\text{-}5)$$
$$= (1-2\alpha)*As*4/\pi*\text{SIN}(\pi*Dts)/$$
$$(A0*4/\pi)$$
$$= (1-2\alpha)*As*\text{SIN}(\pi*Dts)/A0$$

Since $$As = A0*Dt0/Dts = A0*0.5/Dts \quad (6\text{-}6)$$

the relationship to α is represented by the same result as equation (3-15), that is, $$|FND\_s\_relative| = (1-2\alpha)*(0.5/Dts)*\text{SIN}(\pi*Dts) \quad (6\text{-}7)$$

That is, in this embodiment, the same control as in the first embodiment can be done using α and Dts. In the third embodiment, however, the manner the double image appears in visual tracking changes from that of the first embodiment in accordance with the level of the flicker adjustment value. More specifically, when the flicker is maximum (that is, α=0), the double image is the same as in the first embodiment or as in the display method shown in FIG. 3. On the other hand, as the flicker adjustment value is set to be smaller, an image closer to a quadruple image appears.

In this embodiment, from the viewpoint of reproducing screening in a theater, the performance is poor because the double image is spoiled. However, there are advantages in terms of cost because, for example, no low-pass filter is necessary, and the circuit scale becomes smaller.

Note that in this embodiment, the effect does not change even when the positions of even-numbered signals and odd-numbered signals are exchanged. That is, the same effect can be obtained.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-163005, filed Jul. 9, 2009, which is hereby incorporated by reference herein in its entirety.

What is claimed is:

1. An image display apparatus, comprising:
    a filter which obtains low-frequency image data from input image data;
    a multiplier which multiplies the low-frequency image data obtained by said filter by a predetermined ratio;
    a subtracter which subtracts, from the input image data, the low-frequency image data multiplied by the predetermined ratio by said multiplier to obtain high-frequency image data;
    buffer memories, each of which temporarily stores a corresponding one of the low-frequency image data and the high-frequency image data;
    a display control unit which reads and displays, in alternate order, the low-frequency image data and the high-frequency image data stored in said buffer memories; and
    an adjustment unit which adjusts the predetermined ratio so as to set a flicker of an image displayed by said display control unit to a predetermined level.

2. The apparatus according to claim 1, further comprising an ambient light sensor which detects brightness of an environment where the image display apparatus is installed,
    wherein said adjustment unit adjusts the predetermined ratio based on the brightness of the environment detected by said ambient light sensor.

3. The apparatus according to claim 1, further comprising a distance sensor which detects a distance between a user and the image display apparatus,
    wherein said adjustment unit adjusts the predetermined ratio based on the distance detected by said distance sensor.

4. The apparatus according to claim 1, further comprising a user interface which allows a user to designate a flicker value representing a flicker level,
    wherein said adjustment unit adjusts the predetermined ratio based on the flicker value designated via said user interface.

5. A method of controlling an image display apparatus, comprising the steps of:
    obtaining low-frequency image data from input image data;
    multiplying the low-frequency image data obtained in the step of obtaining the low-frequency image data by a predetermined ratio;
    subtracting, from the input image data, the low-frequency image data multiplied by the predetermined ratio in the multiplying step to obtain high-frequency image data;
    storing the low-frequency image data and the high-frequency image data in buffer memories, respectively;
    reading and displaying, in alternate order, the low-frequency image data and the high-frequency image data stored in the buffer memories; and
    adjusting the predetermined ratio so as to set a flicker of an image displayed in the step of reading and displaying the image data to a predetermined level.

* * * * *